United States Patent [19]

Brown

[11] 3,966,098

[45] June 29, 1976

[54] PAINT APPLICATOR

[75] Inventor: Joseph F. Brown, Oakland, N.J.

[73] Assignee: The Raymond Lee Organization, Inc., New York, N.Y. ; a part interest

[22] Filed: Sept. 17, 1974

[21] Appl. No.: 506,771

[52] U.S. Cl. ................................ 222/413; 239/225

[51] Int. Cl.[2] .......................................... G01F 11/22

[58] Field of Search ...................... 198/213; 302/30; 222/413, 333, 372, 320; 401/72, 361, 165, 365; 15/97 R, 29 R; 239/302, 380, 225, 325; 64/30 E

[56] References Cited

UNITED STATES PATENTS

| | | | |
|---|---|---|---|
| 1,586,997 | 6/1926 | Hull | 239/225 |
| 2,542,855 | 2/1951 | Willison | 239/302 X |
| 3,600,906 | 8/1971 | Schultz | 64/30 E |
| 3,704,076 | 11/1972 | Bodunov et al. | 222/413 X |

*Primary Examiner*—Drayton E. Hoffman
*Assistant Examiner*—Norman L. Stack, Jr.
*Attorney, Agent, or Firm*—Howard I. Podell

[57] ABSTRACT

A paint applicator which is rotatably powered, which draws paint from a supply container and ejects it against a flat surface through the center of a rotating disc, with the surface of the disc serving to rotatably brush the ejected paint on the painted surface. The applicator incorporates a cylindrical housing that encloses a rotatable worm gear linked to a rotatable jaw attachable to an electric drill chuck. A paint supply tube is joined to a collar rotatably mounted about the housing, with openings in the housing wall connected to the interior of the collar for drawing paint from the supply tube, through the collar into the interior of the housing. The worm gear ejects the paint through a perforation in the center of a disc attached to the free end of the housing, with fiber projections along the periphery of the disc serving to brush the ejected paint onto the painted surface. The housing and attached disc are joined to the rotatable worm gear drive by an adjustable friction collar so that the housing and attached disc may rotate at a different speed than the worm gear, when the unit is attached to a portable electric drill motor or other rotatable power drive mechanism.

3 Claims, 3 Drawing Figures

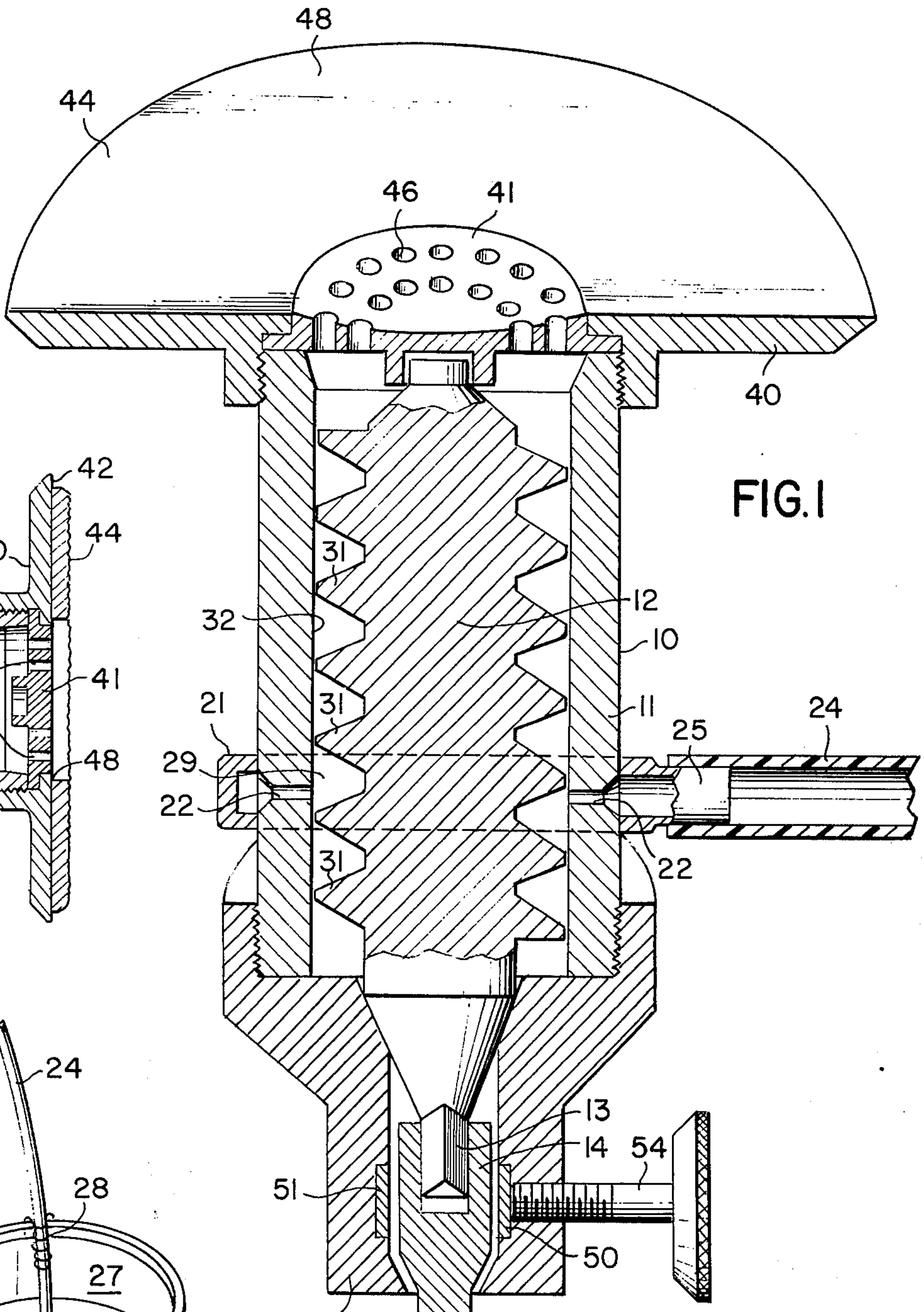
FIG. 1
FIG. 2
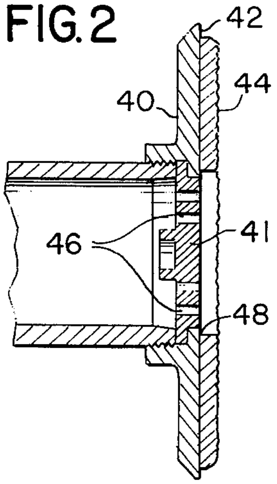
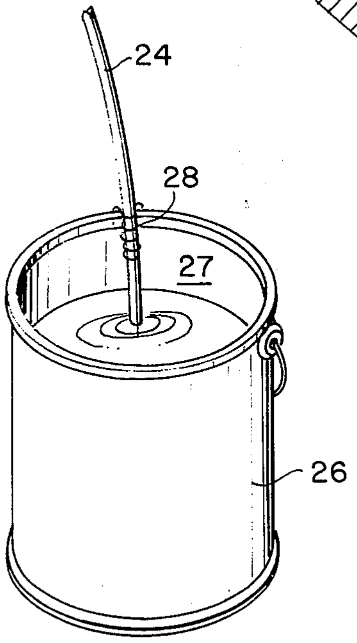
FIG. 3

PAINT APPLICATOR

SUMMARY OF THE INVENTION

A paint applicator which is rotatably powered, which draws paint from a supply container and ejects it against a flat surface through the center of a rotating disc, with the surface of the disc serving to rotatably brush the ejected paint on the painted surface.

The applicator incorporates a cylindrical housing that encloses a rotatable worm gear linked to a rotatable jaw attachable to an electric drill chuck.

A paint supply tube is joined to a collar rotatably mounted about the housing, with openings in the housing wall connected to the interior of the collar for drawing paint from the supply tube, through the collar into the interior of the housing.

The worm gear ejects the paint through a perforation in the center of a disc attached to the free end of the housing, with fiber projections along the periphery of the disc serving to brush the ejected paint onto the painted surface.

The housing and attached disc are joined to the rotatable worm gear drive by an adjustable friction collar so that the housing and attached disc may rotate at a different speed than the worm gear, when the unit is attached to a portable electric drill motor or other rotatable power drive mechanism.

While the invention is described as an attachment for a portable electric drill motor, the unit can incorporate an electric motor and gear drive so as to be self-powered.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective sectional view of the invention;

FIG. 2 is a sectional view of the disc bonnet which serves to feed and brush paint onto a surface; and FIG. 3 is a perspective view of the paint supply tube fastened to a paint container.

DESCRIPTION OF THE PREFERRED EMBODIMENT:

Turning now descriptively to the drawings, in which similar reference characters denote similar elements throughout the several views, FIGS. 1–2 illustrate the device 10 which comprises a cylindrical housing 11 inside of which, a worm gear 12 is rotatably mounted, with one end of the worm gear fitted with a shaped plug 13 that is detachably engaged by a mating socket 14 of a rotatable pin 15. Pin 15 projects beyond the end of the housing 11, for fastening to the chuck of a portable electric drill (not shown).

A hollow collar 21 is rotatably mounted about the exterior of the housing 11 in the plane of a ring of through perforations 22 in the housing 11. A flexible supply tube 24 is joined to an inlet tube fitting 25 mounted on collar 21, with tube 24 led to a container 26 of point 27 and fastened by a spring clip 28 to the container 26.

Rotation of worm gear 12, with respect to the housing 11 draws paint from container 26 through tube 24 and collar 21 into the interior 29 of the housing 11 between the teeth 31 of the worm gear 12 and the interior wall surface 32 of the housing 11, with such rotation of worm gear 12 forcing paint to the free end of the housing. The free end of the housing 11 is capped by a circular bonnet 40 fitted with a perforated central disc 41. The periphery of the outer surface 42 of the bonnet is fitted with a detachable circular ring 44 of fibrous absorbent material for rotatably brushing paint onto a surface against which bonnet 40 is pressed, with the paint fed to the surface 44 of the bonnet through perforations 46 in central disc 41 from the interior of housing 11, by worm gear 12. The ring 44 of fibrous material may be fastened to the external surface 48 of bonnet 40 by means of Velcro nylon sheetings fixed to the surface 44 of bonnet 40 and to the undersurface of the rings 44.

Housing 11 is linked to the exterior of rotatable pin 15 by a friction clutch 50 which is comprised of a split ring 51 mounted in the interior of the housing end wall 53, and an adjustable screw 54 threaded into said wall 53 to bear against the collar 51. Split ring 51 frictionally engages the periphery of rotatable pin 15 to the extent dictated by the adjustment of screw 54 so that the housing will rotate at a slower rate than pin 15 and worm gear 12.

Bonnet 50 is threadably attached to housing 11 for ready removal and worm gear 12 may be replaced for a gear of another pitch, when the bonnet 40 is removed.

Alternately, the housing 11 and the worm gear 12 may be joined to a permanent motor and gear drive incorporated in the device.

Since obvious changes may be made in the specific embodiment of the inveniton described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A dispenser and applicator of paint, comprising
   a hollow tubular housing mounted to rotate within
   a hollow collar rotatably mounted about the exterior of said housing so that said collar remains relatively fixed when the enclosed housing is rotated,
   a worm gear mounted inside of said housing so as to be free to rotate with respect to said housing,
   said worm gear fitted at a first end with a drive member that extends externally beyond a first axial end of the housing,
   said drive member externally shaped to engage a means of rotatable power,
   a circular disc, which serves as a dispenser and applicator of liquid coating, externally joined to a second axial end of said housing, said disc formed with through perforations leading to the interior of the housing,
   said hollow collar fitted with attachment means to join a dispensing tube leading from a supply of liquid coating to the interior of the collar, with said housing fitted with through perforations in the wall of the housing surrounded by the collar, said perforations leading to the interior of the collar so that liquid coating in the collar interior is led into the interior of the housing, and
   drive means to rotate the housing with respect to the worm gear inside the housing, when the worm gear is rotated by rotation of the drive member, such that rotation of the worm gear within the housing, relative to the housing, forces liquid coating in the housing interior out of the perforations of the disc and onto the external surface of the disc for application by the disc to a surface to be coated, said rotation of the worm gear serving to draw said coating into the housing through the perforations in the housing wall leading to the interior of the collar and serving to consequently draw said coating into the collar interior from a dispensing tube attached to the collar leading from a supply of liquid coating, with rotation of the housing serving to rotate the disc to rotatably apply the coating on the exterior of the disc to a surface to be coated.

2. The combination as recited in claim 1 in which the drive means for rotation of the housing is in the form of an adjustable friction clutch linking the worm gear to the housing, so that rotation of the worm gear by the drive member serves to furnish a first frictional torque to cause the housing to rotate, said first frictional torque being countered by a second frictional torque caused when the user applies axial pressure between the disc and a surface to be coated, said second frictional torque serving to retard the rotation of the housing so that the housing rotates at a lesser angular velocity than the worm gear, with the consequent rotation between the worm gear and the enclosed housing serving to carry a supply of coating from the housing interior to the exterior of the disc.

3. The combination as recited in claim 1 in which the drive member is externally shaped to fit the chuck of a portable drill.

* * * * *